United States Patent [19]

Hirono

[11] Patent Number: 5,374,130
[45] Date of Patent: Dec. 20, 1994

[54] CORD LABEL PRODUCING DEVICE AND METHOD

[75] Inventor: Kazuhisa Hirono, Nagoya, Japan

[73] Assignee: Brother Kogyo Kabushiki Kaisha, Nagoya, Japan

[21] Appl. No.: 171,618

[22] Filed: Dec. 22, 1993

[30] Foreign Application Priority Data

Feb. 18, 1993 [JP] Japan ................... 5-055054

[51] Int. Cl.$^5$ .............................. B41J 11/44
[52] U.S. Cl. ..................... 400/68; 395/115; 101/288
[58] Field of Search ............ 400/614, 120, 68, 61, 400/76, 104; 101/2, 288; 395/115

[56] References Cited

U.S. PATENT DOCUMENTS

| | | | |
|---|---|---|---|
| 3,645,391 | 2/1972 | Hirakawa et al. | 101/2 |
| 4,826,558 | 5/1989 | Wada et al. | 101/288 |
| 4,882,116 | 11/1989 | McMillen et al. | 264/254 |
| 5,009,530 | 4/1991 | Kuzuya et al. | 400/120 |
| 5,021,916 | 6/1991 | Hubbard | 361/171 |
| 5,193,926 | 3/1993 | Kuzuya et al. | 400/120 |
| 5,294,283 | 3/1994 | Guardiola | 156/566 |
| 5,322,378 | 6/1994 | Ikeda et al. | 400/68 |

FOREIGN PATENT DOCUMENTS 4-43788  7/1992  Japan .

*Primary Examiner*—Eugene H. Eickholt
*Attorney, Agent, or Firm*—Oliff & Berridge

[57] ABSTRACT

A device is provided that produces a label used for a cord. The device is capable of forming winding margins coincident with the particular size of various power cords by a simple operation and is capable of creating cord labels easily affixed to the respective power cords. When cord labels are wound on the periphery of a cord, a required winding margin is set corresponding to the size of the cord, and text is printed on at least one side of the winding margin. Further, preferably when the texts are printed on both sides, a straight line is printed at the intermediate position of the margin to extend in the transverse direction of the label to aid in positioning.

30 Claims, 10 Drawing Sheets

| ITEM | INSTRUCTIONS |
|---|---|
| S1 | IS ANY KEY OPERATED ? |
| S2 | IS FUNCTION KEY OPERATED ? |
| S3 | TMF=1 ? |
| S4 | INPUT AND STORE CHARACTERS |
| S5 | DISPLAY ERROR |
| S6 | IMF=1 ? |
| S7 | IMF←0, KMF←1 |
| S8 | CHANGE TO CODE KIND DISPLAY MODE |
| S9 | KMF=1 ? |
| S10 | TMF←0, IMF←1 |
| S11 | DISPLAY CONTENTS OF TEXT |
| S12 | IS PRINT MODE CHANGEOVER KEY OPERATED ? |
| S13 | IS CURSOR KEY OPERATED ? |
| S14 | IS SELECTION KEY OPERATED ? |
| S15 | EXECUTE PROCESS CORRESPONDING TO KEY |
| S16 | EXECUTE OTHER PROCESS |
| S17 | TMF=1 ? |
| S18 | CHANGE TO PRINT MODE DISPLAY |
| S19 | TMF←0, IMF←1 |
| S20 | IMF=1 ? |

Fig.5C

| ITEM | INSTRUCTIONS |
|---|---|
| S21 | TF=1 ? |
| S22 | TF←0, KF←1 |
| S23 | CHANGE PRINT MODE |
| S24 | KMF=1 ? |
| S25 | UPDATE KN |
| S26 | DISPLAY KN ON LIQUID CRYSTAL DISPLAY |
| S27 | DISPLAY ERROR |
| S28 | TF←1, KF←0 |
| S29 | EXECUTE OTHER PROCESS |

CORD LABEL PRODUCING DEVICE AND METHOD

BACKGROUND OF THE INVENTION

1. Field of the Invention

The present invention relates to a device for producing a label used for a power cord or the like. The label is wound around and affixed to the power cord or the like and is used to identify the power cord or the like. This invention particularly relates to a cord label producing device capable of creating a cord label that is easily affixed to a power cord or the like by a simple operation.

2. Description of Related Art

When a number of power cords are normally connected to outlets, OA taps or the like, convenience can be offered to users if the power cords can be distinguished in kind from each other so that they are easily seen. To easily distinguish between different power cords, cord labels have been affixed to the power cords.

Various labels have previously been proposed which are usable as such cord labels. A known tape printing device that is capable of creating such labels is disclosed in U.S. Pat. Nos. 5,009,530 and 5,193,926 and Japanese Patent Publication No. Hei 4-43788, for example. This type of tape printing device is constructed so that characters such as cord names are printed on the reverse side of a transparent film tape and then a pressure sensitive adhesive double coated tape with a releasable paper is stuck on the printed surface of the film tape, thereby creating a tape with characters printed thereon.

This tape is used by winding an adhesive surface of the pressure sensitive adhesive double coated tape on a power cord or the like after the releasable paper has been separated from the film tape.

Since each of the cord labels is wound on the power cord in use, it is necessary to form a suitable winding margin in view of the size or diameter of the cord. Also, characters indicative of the name of the cord must be printed on both sides of the margin at two positions to enable easy confirmation of the kind of cord.

In the conventional tape printing device, however, there is no special function for creating the cord label. In particular, a means for setting winding margins corresponding to sizes or diameters of various cords is not provided. Thus, when the cord label is produced by such a tape printing device, two texts such as characters indicative of the designations or names of cords were created via a keyboard, and a plurality of spaces were inserted between the texts as necessary to form a winding margin for the cords.

The so-formed winding margin is made in advance in view of the size or diameter of each cord by an operator. It is however very hard to actually bring the formed winding margin into alignment with the size of each cord. Thus, when the winding margin is not made coincident with the size of each cord when actually winding the produced cord label on each cord, it was necessary to change the number of the spaces to be inserted between the texts and to repeatedly recreate the label. It is thus difficult and time consuming for the conventional tape printing device to accurately produce a useful cord label. Further, the conventional tape printing device often requires the label to be recreated over and over again to accurately determine the margin and spacing, which becomes cumbersome and wastes materials.

SUMMARY OF THE INVENTION

The present invention was made to solve the problems of the related art. Therefore, an object of the present invention is to provide a cord label producing device capable of forming winding margins coincident with sizes of various power cords by an extremely simple operation and producing cord labels easily affixed to the respective cords.

To achieve the above and other objects, the present invention provides a cord label producing device having a cord label wound around the periphery of a cord, text producing means for creating texts formed of document data such as characters, a text memory for storing therein text data about the texts created by the text producing means, and printing means for printing the characters and the like on the cord label according to the text data stored in the text memory. The invention further comprises cord winding margin setting means for setting a margin required to wind the cord label on the cord when the cord label is wound on the periphery of the cord and print controlling means for controlling the printing means for printing the characters and the like on both sides of the margin set by the cord winding margin setting means based on the texts created by the text producing means. Further, the print controlling means controls the printing means so that a straight line is printed at the intermediate position of the margin set by the cord winding margin setting means to extend in the transverse direction of the label.

According to this invention, the text producing means first creates one text made up of the document data such as the characters corresponding to the names of the cords. The so-created text is then stored in the text memory as the text data. Next, the winding margin required to wind the cord label on the periphery of each cord is set by the cord winding margin setting means in view of the size of each cord.

Thereafter, the printing means is controlled by the print controlling means so that the text is printed on one side of the winding margin set by the cord winding margin setting means on the cord label according to the text data stored in the text memory if desired. The text is then printed on the other side of the winding margin according to the text data stored in the text memory if desired. Thus, the characters or the like corresponding to the names of the cords and the like can be printed on both sides of the winding margin set by the cord winding margin setting means on the cord label. Further, a straight line is printed at the intermediate position of the winding margin to extend in the transverse direction of the label. As described above, the present invention can provide a cord label producing device that forms a winding margin coincident with the size of various power cords by an extremely simple operation. Cord labels are created that are easily affixed to respective cords, thereby increasing efficiency and accuracy.

DETAILED DESCRIPTION OF PREFERRED EMBODIMENTS

The present invention is described below in detail with reference to the accompanying drawings in which a specific embodiment is shown by way of illustrative example.

Figure 1:
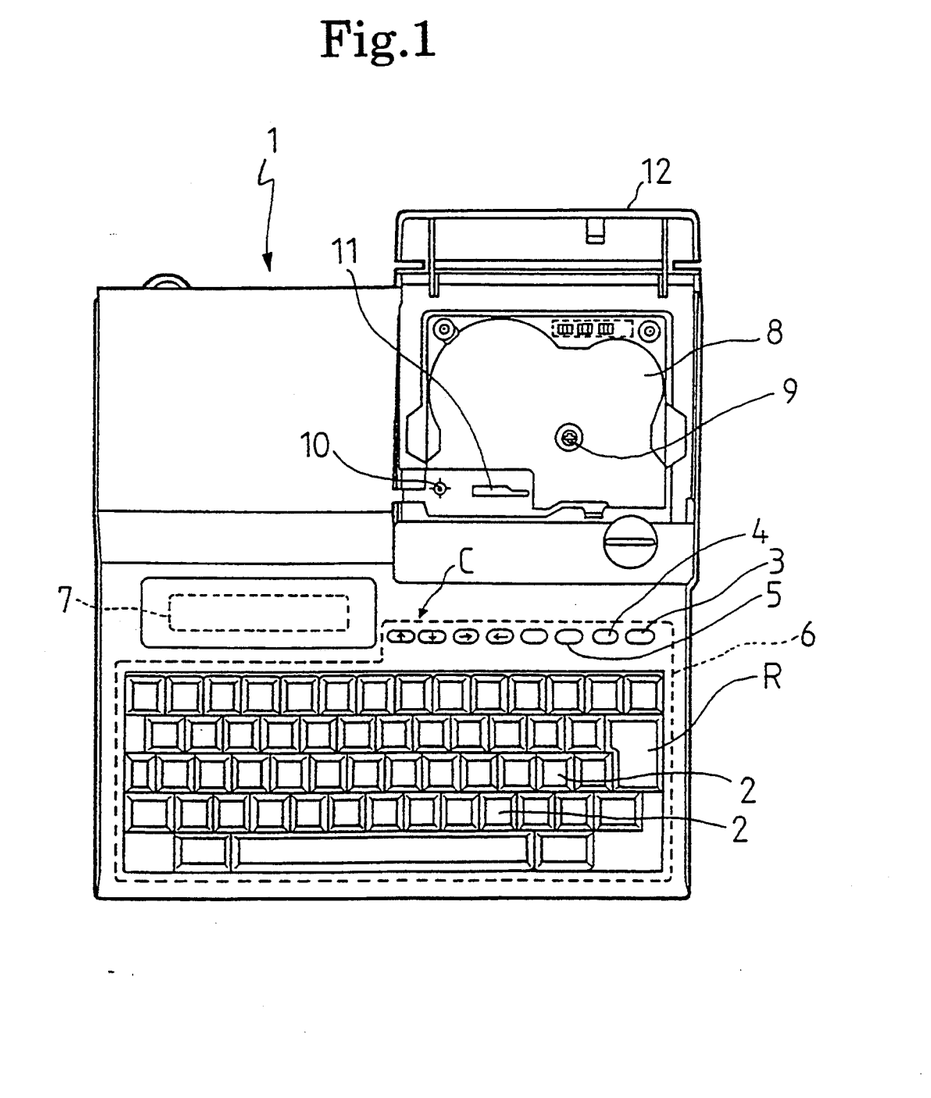
FIG. 1 is a plan view showing a label producing device in which a holding cover of a tape cassette holder is open.

FIG. 1 is a plan view showing a label producing device in which a cassette storage or holding cover of a tape cassette holder is open. In FIG. 1, the label producing device 1 has a keyboard 6 comprising a character input key 2 for inputting characters, such as letters, in the form of a plurality of lines to thereby create a text formed of text or document data (code data), a print key 3 for issuing a text printing instruction, and a print mode changeover key 4 for alternately selecting a normal print mode and a label print mode. A selection key 5 selects one of a print mode display and a code kind display on a liquid crystal display 7 and selects one of the code kind display and a text mode display. A cursor key C moves a cursor in upward and downward directions and left and right directions on the liquid crystal display 7, and a return key R issues a line-feed instruction and an instruction for executing various processes. The liquid crystal display 7 displays characters and the like inputted via the keyboard 6. A cassette holder 8 holds or accommodates therein a tape cassette 13 to be described later. The respective keys other than the character input key 2 are called "function keys."

A ribbon winding or take-up shaft 9 rotatably driven by a pulse motor, not shown, is provided in the cassette holder 8 and is used to rotate a ribbon take-up spool 21 of the cassette tape 13 to wind a thermal ink ribbon 17 thereon. Further, a tape feed roller shaft 10 rotatably driven by a tape feed motor 40 via a suitable transmission mechanism is vertically provided on the key board 6 side of the cassette holder and is used to rotate a tape feed roller 27. Moreover, a thermal head 11 for printing characters and the like on a film tape 15 by the thermal ink ribbon 17 is fixedly provided in front of the cassette holder 8.

The cassette holder 8 is opened and closed by a cassette holding cover 12 rotatably and pivotably supported at a position behind the label producing device 1. When the cassette holder 8 is in an open state, the tape cassette 13 can be replaced.

Figure 2:
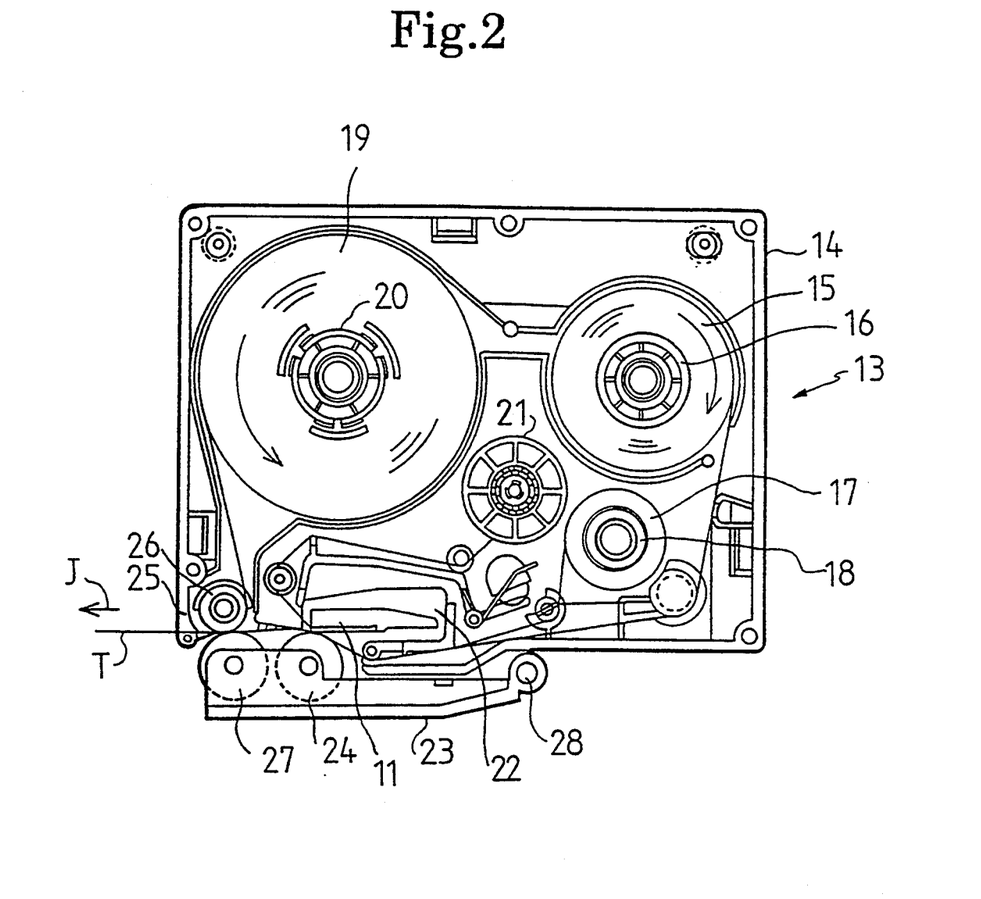
FIG. 2 is a plan view showing a tape cassette accommodated in the tape cassette holder.

The structure of the tape cassette 13 is described referring to FIG. 2. FIG. 2 is a plan view showing the tape cassette 13 (whose upper case has been omitted) accommodated into the cassette holder 8.

In FIG. 2, a tape spool 16 having a transparent film tape 15 wound thereon, a ribbon spool 18 having the thermal ink ribbon 17 wound thereon, and a pressure sensitive adhesive tape spool 20 on which a pressure sensitive adhesive double coated tape 19 with a released paper has been wound with its released paper set in an outward direction, are respectively provided within a lower case 14. The respective spools 16, 18 and 20 are rotatably supported by their corresponding support sections attached to the lower surface of the upper case (not shown) in cooperation with the support sections.

Similarly, a ribbon take-up spool 21 is rotatably supported among the spools 16, 18 and 20. The ribbon take-up spool 21 is maintained in meshing engagement with the ribbon take-up shaft 9, which is in turn driven to wind thereon the thermal ink ribbon 17 that has been used for printing characters.

Further, the thermal head 11 is disposed within a concave portion 22 defined in the lower case 14. A platen roller 24 rotatably supported by a roller holder 23 is disposed to oppose the thermal head 11 at the position where the platen roller 24 can be pressed against the thermal head 11. The thermal head 11 has a number of heating elements. For example, the thermal head 11 of the label producing device 1 according to the present embodiment has 128 heating elements. The thermal head 11 also prints characters and the like on the film tape 15 using the thermal ink ribbon 17.

A tape pressure roller 26 is rotatably provided in the vicinity of a tape discharge or ejection section 25 (provided on the left lower side as seen in FIG. 2) of the lower case 14. The tape feed roller 27 rotatably supported by the roller holder 23 is disposed in an opposing relationship to the tape pressure roller 26 at the position where the tape feed roller 27 can be pressed against the tape pressure roller 26.

The roller holder 23 is rotatably and pivotably supported on a support shaft 28 at the position where it extends forward from the tape cassette 13 (located on the lower side as seen in FIG. 2). The roller holder 23 can be switched over to either one of a print and a release position by a manual changeover mechanism (not shown.) (FIG. 2 shows the roller holder 23 changed to the print position.)

The platen roller 24 and the tape feed roller 27 are respectively rotatably attached to the roller holder 23 and disposed to press against the thermal head 11 and the pressure roller 26 when the roller holder 23 has been changed to the print position. Incidentally, the tape feed roller 27 is rotatably driven by the tape feed roller shaft 10. At the same time, the pressure roller 26 is rotatably driven by a gear mechanism (not shown) in linkage with the tape feed roller 27.

The pressure roller 26 and the tape feed roller 27 bonds the surface of an adhesive mass of the pressure sensitive adhesive double coated tape 19 to the film tape 15 having the characters printed thereon by pressure, thereby producing a tape T as a final stage and feeding it in the direction indicated by the arrow J. Incidentally, the produced tape T is cut by a cutter (not shown) provided on the left side of the tape cassette 13. The structure of the cutter is already known and its description is therefore omitted in the present embodiment.

Figure 3:
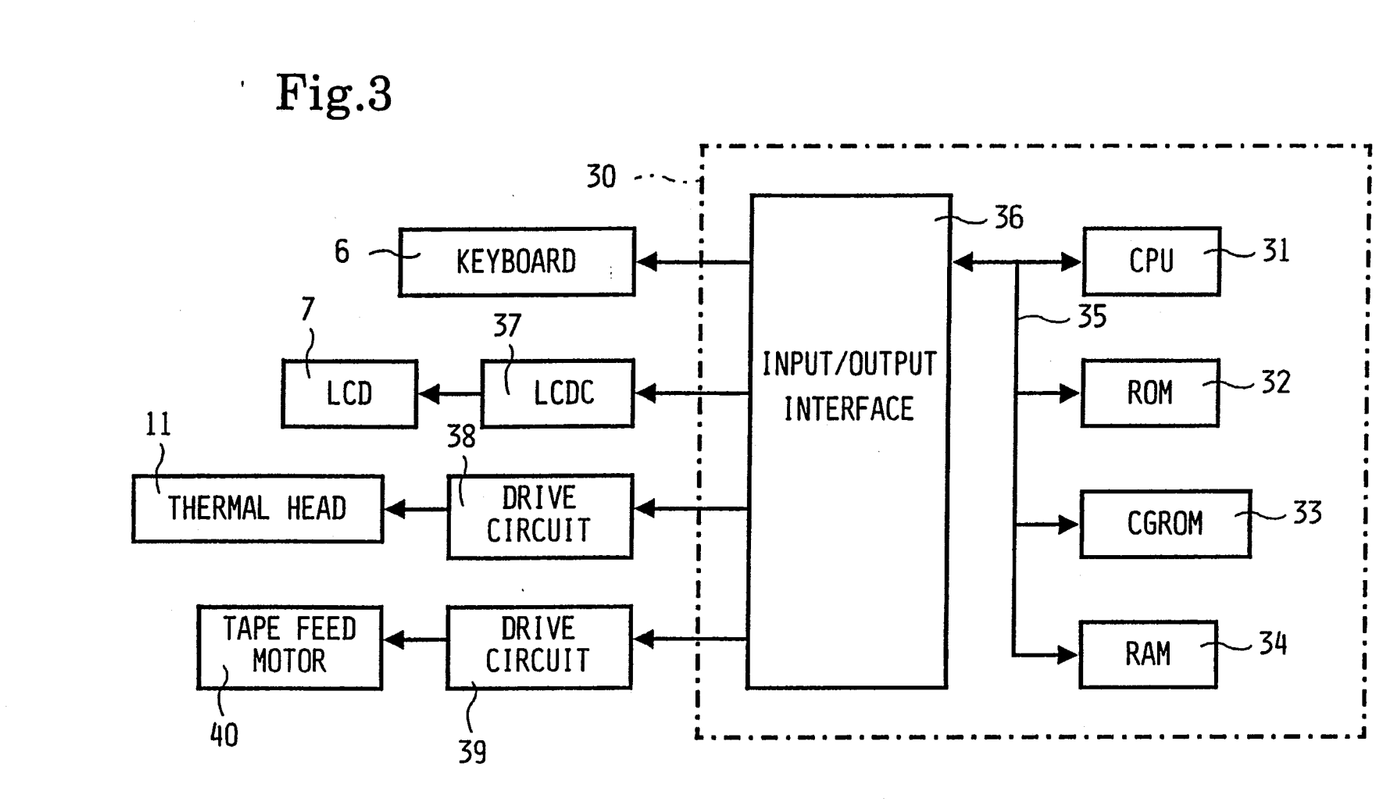
FIG. 3 is a control block diagram schematically showing the label producing device of FIG. 1.

A control system of the label producing device 1 constructed as described above is next described with reference to FIG. 3. FIG. 3 is a control block diagram of the label producing device 1. The control system is made up of a control unit 30 serving as the center. The control unit 30 comprises a CPU 31, a ROM 32, a CGROM 33 and a RAM 34, which are interconnected with each other by a bus 35 and also electrically connected to an input/output interface 36.

The ROM 32 is used to store therein various programs such as a basic control program, a print control program and other various programs required to control the label producing device 1. The CPU 31 performs various computations based on the various programs stored in the ROM 32. Further, the ROM 32 stores therein outline data for specifying outlines of a number of characters such as letters, etc. so that the outline data are classified in types (Gothic type, Ming type, etc.) and correspond to code data. Moreover, the ROM 32 stores therein various data about values indicative of cord winding margins in the form of a table. The winding margins are obtained by representing various values that correspond to the values indicative of lengths of the winding margins stored as KN values, each of which represents a value of one-half the length of each winding margin. The ROM 32 also stores data about winding lengths or margins required to wind a tape on the periphery of a power cord according to the thickness or size of the power cord.

The CGROM 33 stores therein dot pattern data corresponding to respective characters inputted via the keyboard 6. After the dot pattern data has been read from the CGROM 33 and developed, it is transferred to an image buffer 42 to be described later.

The RAM 34 is used to temporarily store therein various results computed by the CPU 31. Further, the RAM 34 is provided with various memories as shown in FIG. 4.

Figure 4:
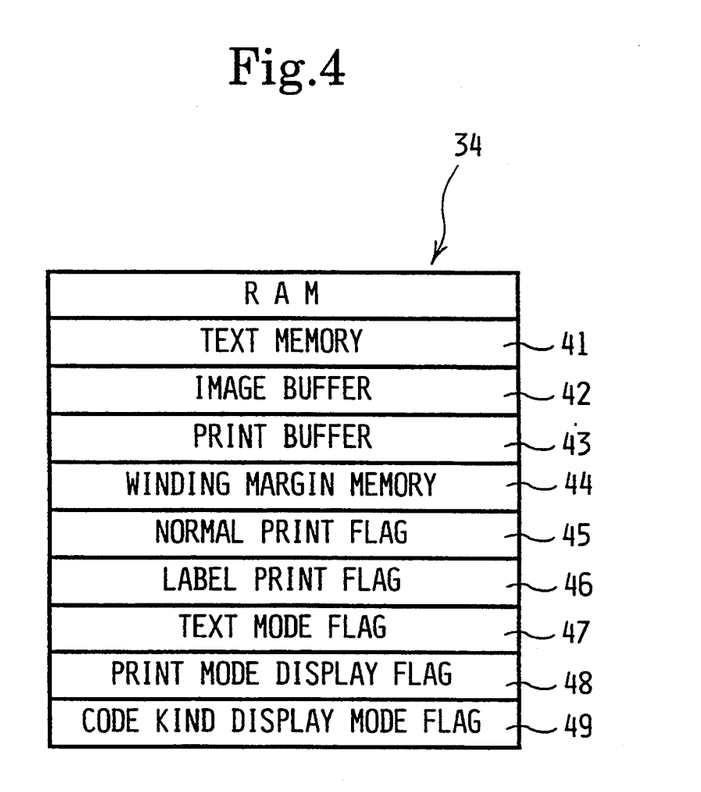
FIG. 4 is an explanatory schematic view typically showing the contents of a RAM.

Referring to FIG. 4, a text memory 41 stores therein code data corresponding to characters inputted via the keyboard 6 as document data (text). The image buffer 42 stores, in developed form, the dot pattern data read from the CGROM 33 in association with the document data of the text stored in the text memory 41.

Further, a print buffer 43 receives the dot pattern data transferred from the image buffer 42 and stores it therein. The thermal head 11 prints characters in the form of dot patterns according to the dot pattern data stored in the print buffer 43. A winding margin memory 44 stores therein winding margin data input according to the size of the power cord.

A normal print flag (TF) 45 represents a flag set to "1" when the print mode changed over by the print mode changeover key 4 is in the normal print mode. A label print flag (KF) 46 corresponds to a flag set to "1" when the print mode changed over by the print mode changeover key 4 is in the label print mode. A text mode flag (TMF) 47 shows a flag set to "1" when the print mode is in a text input mode. A print mode display flag (IMF) 48 represents a flag set to "1" when the liquid crystal display 7 is brought to a mode indicative of the print mode (corresponding to each of the normal print mode and the label print mode). Further, a code kind display mode flag (KMF) 49 represents a flag set to "1" when the liquid crystal display 7 shows the size or thickness of the cord upon setting the winding margin data.

Referring back to FIG. 3, a further description is made of the control block diagram. The keyboard 6 is electrically connected to the control unit 30 via the input/output interface 36. Further, the liquid crystal display 7 and the display controller LCDC 37 are respectively electrically connected to the control unit 30 via the input/output interface 36. When the characters and the like are inputted via the character input key 2 of the keyboard 6, the text data formed of the characters and the like are successively stored in the text memory 41 of the RAM 34. Further, dot patterns corresponding to characters or the like inputted via the keyboard 6 based on a dot pattern generation control program and a display control program are displayed on the liquid crystal display 7.

The thermal head 11 is driven by a drive circuit 38 to print the dot pattern data transferred from the image buffer 42 to the print buffer 43. In synchronism with the printing of the dot pattern data, the tape feed motor 40 is driven by a drive circuit 39 to control the feeding of the tape T in a desired direction.

Figure 5A:
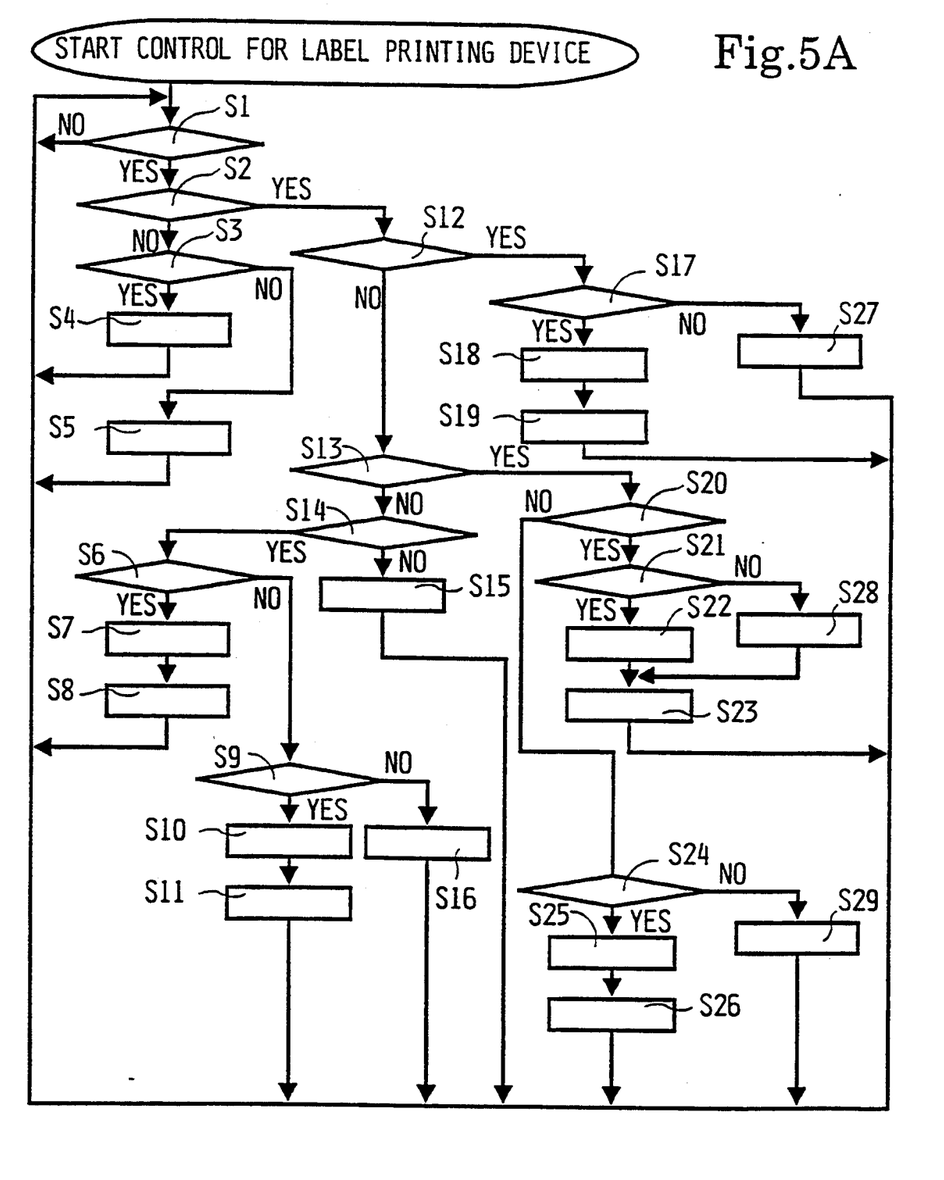
FIG. 5A is a flowchart describing a basic control program for the label producing device of FIG. 1.
Figure 5B:
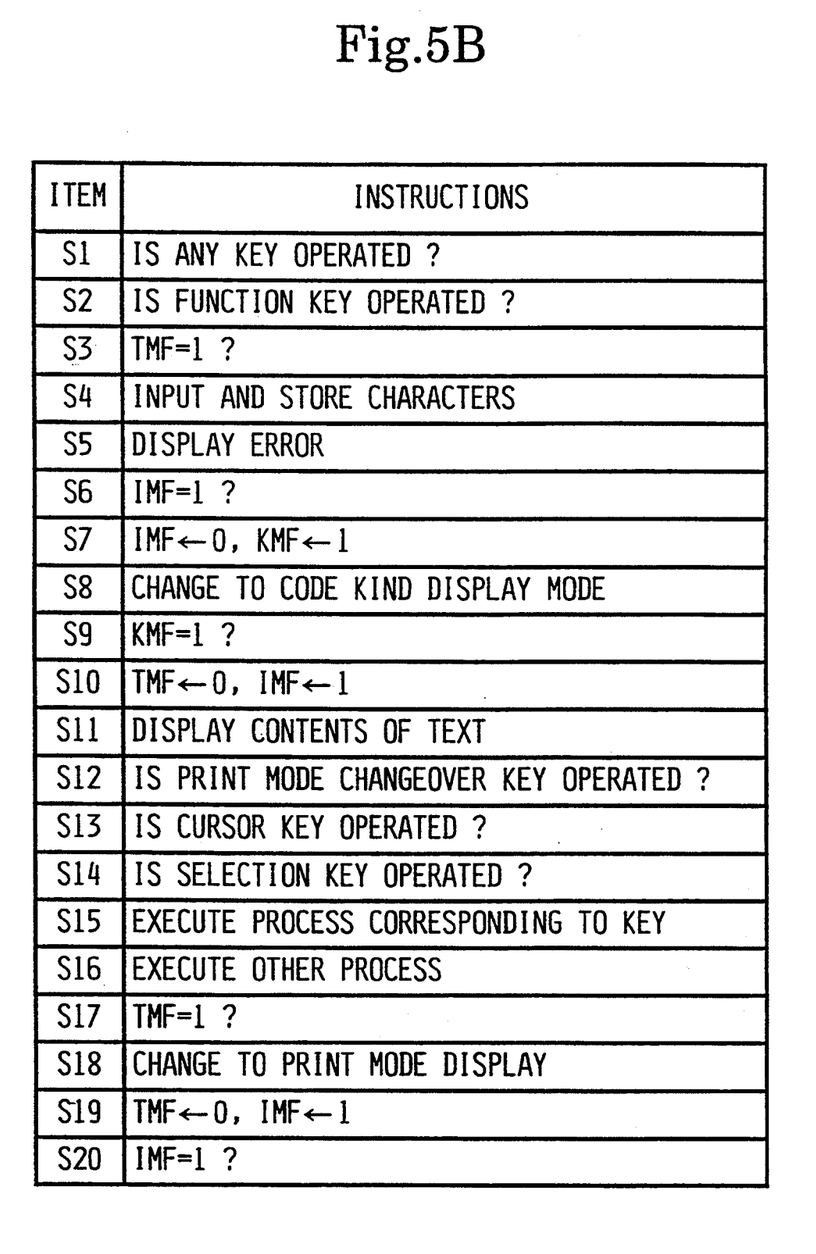
FIG. 5B is a table listing the corresponding steps of the flow chart of FIG. 5A.
Figure 5C:
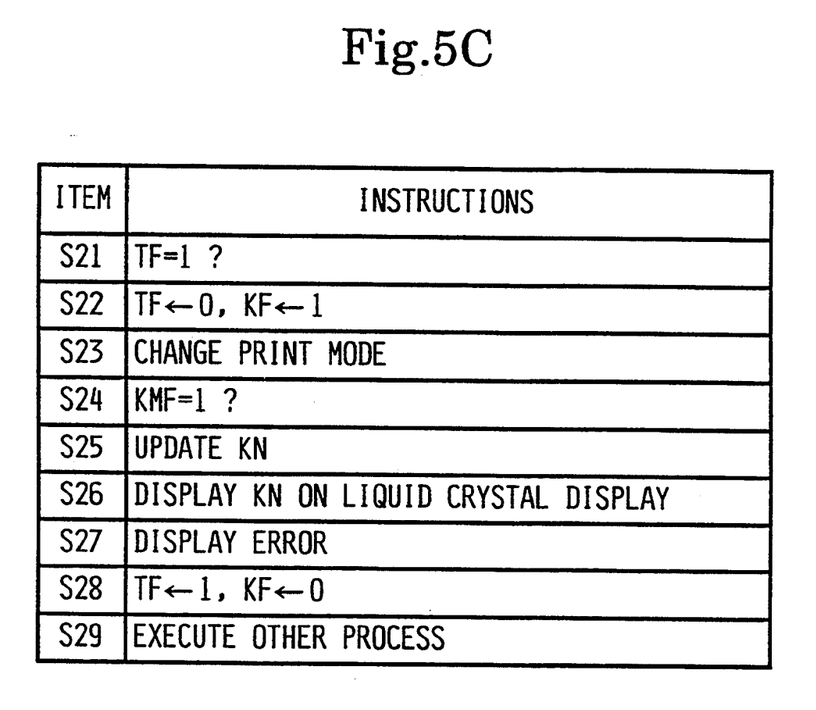
FIG. 5C is a table continued from FIG. 5B listing the corresponding steps of the flowchart of FIG. 5A.

Next, operation of the label producing device 1 constructed as described above is described below with reference to FIGS. 5 through 7. FIG. 5 is a flowchart describing the basic control program of the label producing device 1. When a power switch is turned on, various initial conditions are set and the basic control is started. Upon setting the initial conditions, the normal print flag 45 and the text mode flag 47 are respectively set to "1", and the label print flag 46, the print mode display flag 48 and the code kind display mode flag 49 are respectively reset to "0."

It is determined in Step (hereinafter abbreviated "S") 1 whether or not any one of the keys on the keyboard 6 has been operated. If it is determined that any key is in a non-operated state (i.e., if the answer is NO in S1), then the next task is placed in a waiting state until a key is operated. If it is determined that any key is in an operated state (i.e., if the answer is YES in S1), it is then determined whether or not the function keys such as the print mode changeover key 4 and the like have been operated (S2). If it is determined that the function keys have not been operated (i.e., if the answer is NO in S2), it is then determined whether or not the text mode flag 47 has been set to "1" (S3). If it is determined that the text mode flag 47 has been set to "1" (i.e., if the answer is YES in S3), then characters inputted via the character input key 2 are stored in the text memory 41 (S4) and the routine returns to S1. By repeating the processes in S1 through S4, texts formed of characters and the like, which correspond to the name or designations of a power cord, are created. The texts are successively stored in the text memory 41. If on the other hand, it is determined in S3 that the text mode flag 47 has not been set to "1" (i.e., if the answer is NO in S3), then an error is displayed on the liquid crystal display 7 (S5) and the routine is returned to S1.

If it is determined in S2 that the function keys have been operated (i.e., if the answer is YES in S2), then the routine proceeds to processes corresponding to function keys subsequent to S12. It is first determined in S12 whether or not the print mode changeover key 4 has been operated. If it is determined that the print mode changeover key 4 has been operated (i.e., if the answer is YES in S12), it is then determined whether or not the text mode flag 47 has been set to "1" (S17). When "1" has been set to the text mode flag 47 and the text input mode is set (when the answer is YES in S17), an input given via the print mode changeover key 4 is made effective and the liquid crystal display 7 is changed over to the print mode display (S18). Further, the text mode flag 47 is reset to "0" and the print mode display flag 48 is set to "1" in S19. Thereafter, the routine is returned to S1. If it is determined in S17 that the text mode flag 47 has not been set to "1" (i.e., if the answer is NO in S17), then an input given via the print mode changeover key 4 is made ineffective and an error is displayed on the liquid crystal display 7 (S27) and thereafter the routine is returned to S1.

The text input mode is changed to the print mode display according to S12, S17, S18 and S19.

If it is determined in S12 that the print mode changeover key 4 has not been operated (i.e., if the answer is NO in S12), it is then determined whether or not the cursor key C has been operated (S13). If it is determined that the cursor key C has been operated (i.e., if the answer is YES in S13), it is then determined in S20 whether or not the print mode display flag 48 has been set to "1". If i L is determined that the print mode display flag 48 has been set to "1" (i.e., if the answer is YES in S20), it is then determined whether or not the normal print flag 45 has been set to "1" (S21). If it is determined that the normal print flag 45 has been set to "1" (i.e., if the answer is YES in S21), then the routine proceeds to S22 where the normal print flag 45 is reset to "0" and the label print flag 46 is set to "1". Thereafter, the routine proceeds to S23. If it is determined that the normal print flag 45 has not been set to "1" (i.e., if the answer is NO in S21), then the normal print flag 45 is set to "1" contrary to the above setting and the label print flag 46 is reset to "0" (S28). Thereafter, the routine proceeds to S23. In S23, the normal print mode is changed over to the label print mode according to the process in either S22 or S28. Alternatively, the label print mode is changed over to the normal print mode contrary to the above procedure. Thereafter, the routine is returned to S1.

The normal print mode and the label print mode are alternately changed over by executing the processes in S13, S20, S21, S22 and S28.

Figure 7A:
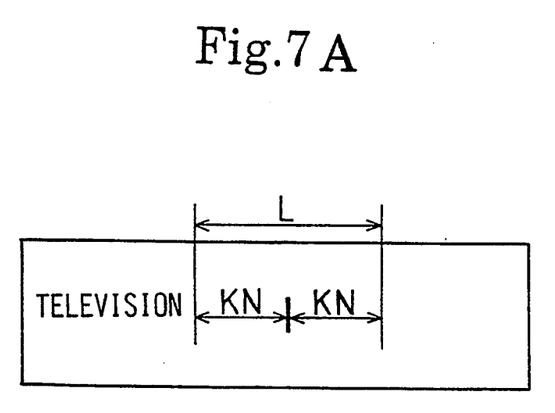
FIG. 7A is a view showing a printed sample in which a text is printed on the left side of a winding margin and a straight line is printed at the intermediate position of the winding margin.

If it is determined in S20 that the print mode display flag has not been set to "1" (i.e., if the answer is NO in S20), then the routine proceeds to S24 where it is determine whether or not "1" has been set to the code kind display mode flag 49. If it is determined that the code kind display mode flag 49 has been set to "1" (i.e., if the answer is YES in S24), then the length of one winding margin (represented in the form of mm) corresponding to the size of the power cord is displayed on the liquid crystal display 7 as one KN value selected from the table of the winding margin values stored in the ROM 32. At this time, the length of the winding margin is represented as the KN value (see FIG. 7) corresponding to a value of one-half the winding-margin length in terms of a print control process to be described later. Then, the represented KN value is updated or brought up to the next new value (S25). The updated KN value is displayed on the liquid crystal display 7 (S26), and the routine is returned to S1. If it is determined in S24 that the code kind display mode flag 49 has not been set to "1" (i.e., if the answer is NO in S24), then a process corresponding to the mode set at a mode other than the code kind display mode is executed (S29), and the routine is returned to S1. The KN value displayed as described above is stored in the winding margin memory 44. After the KN value has been updated, the updated KN value is stored in the winding margin value memory 44 as the updated value.

The KN values corresponding to the winding margin lengths displayed on the liquid crystal display 7 are successively changed by executing the processes in S13, S20, S24, S25 and S26. At the same time, the KN values stored in the winding margin memory 44 are successively updated.

If it is determined in S13 that the cursor key C has not been operated (i.e., if the answer is NO in S13), then the routine proceeds to S14 where it is determined whether or not the selection key 5 has been operated. If it is determined that the selection key 5 has been operated (i.e., if the answer is YES in S14), it is then determined whether or not the print mode display flag 48 has been set to "1" (S6). If it is determined that the print mode display flag 48 has been set to "1" (i.e., if the answer is YES in S6), then the print mode display flag 48 is reset to "0", and the code kind display mode flag 49 is set to "1" (S7). Thereafter, the liquid crystal display 7 is changed to the code kind display mode (S8) and thereafter the routine is returned to S1. Thus, the liquid crystal display 7 is changed from the print mode display to the code kind display mode by executing the processes in S14, S6, S7 and S8.

On the other hand, if it is determined in S6 that the print mode display flag 48 has not been set to "1" (i.e., if the answer is NO in S6), it is then determined whether or not the code kind display mode flag 49 has been set to "1" (S9). If it is determined that the code kind display mode flag 49 has been set to "1" (i.e., if the answer is YES in S9), then the code kind display mode flag 49 is reset to "0", and the text mode flag 47 is set to "1" (S10). Thus, the liquid crystal display 7 is changed to the text input mode, and the text stored in the text memory 41 is displayed on the liquid crystal display 7 (S11). Thereafter, the routine is returned to S1. If on the other hand, it is determined that the code kind display mode flag 49 has not been set to "1" (i.e., if the answer is NO in S9), then a process corresponding to a key operated upon its setting is executed (S16), and the routine returns to S1.

The liquid crystal display 7 is changed from the code kind display mode to the text input mode by executing the processes in S6, S9, S10 and S11.

If it is determined in S14 that the selection key 5 is in non-operation (i.e., if the answer is NO in S14), then a process corresponding to the operated key is effected (S12), and thereafter the routine is returned to S1. When the print key 3 is operated, for example, a print control process is executed.

Figure 6:
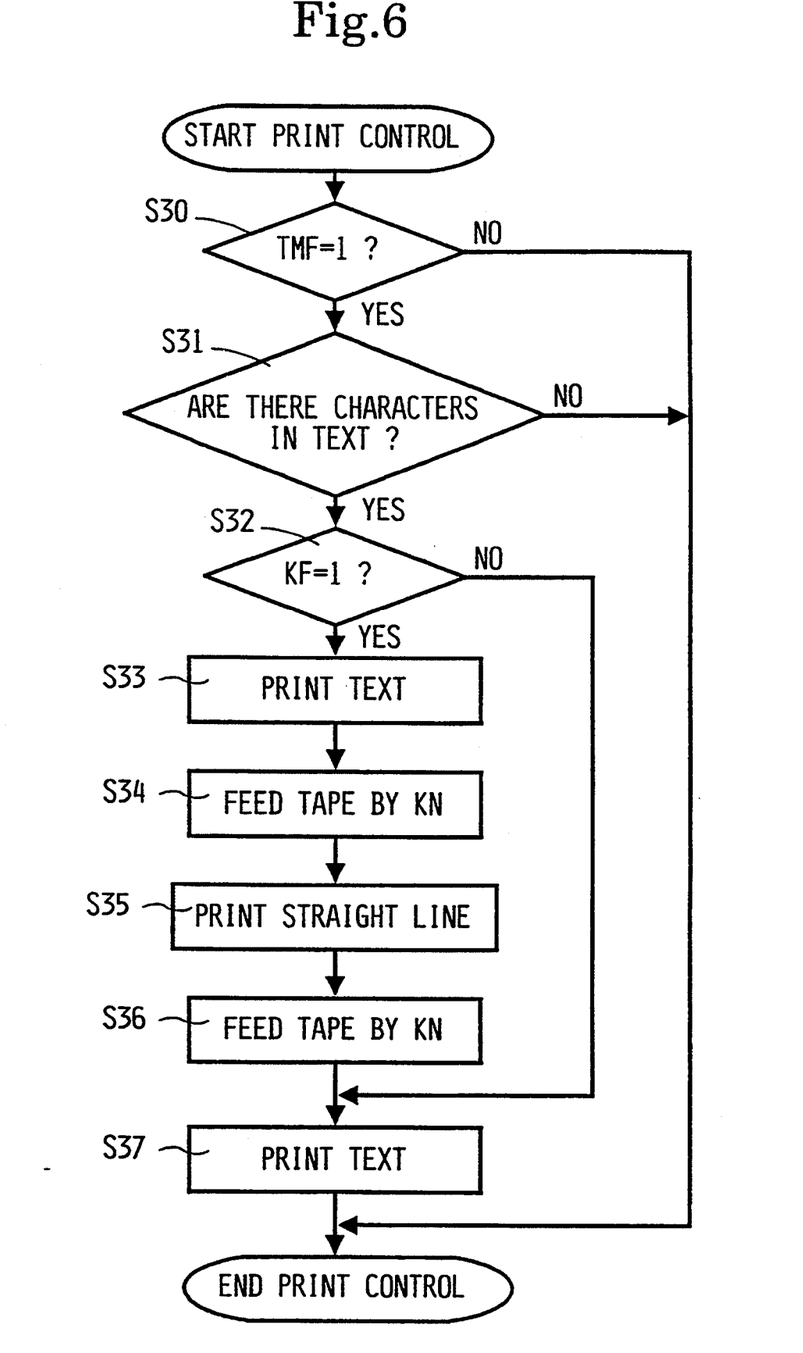
FIG. 6 is a flowchart describing a print control program for the label producing device of FIG. 1.

The print control of the label producing device 1 is described with reference to FIG. 6. FIG. 6 is a flow-chart for describing a print control program. The print control is started based on an input given via the print key 3. It is first determined in S30 whether or not "1" has been set to the text mode flag 47. If it is determined that "1" has been set to the text mode flag 47 (i.e., if the answer is YES in S30), then the routine proceeds to S31. If on the other hand, it is determined that "1" has not been set to the text mode flag 47 (i.e., if the answer is NO in S30), then the input given via the print key 3 is made ineffective. Thereafter, the print control is completed.

It is determined in S31 whether or not a text exists in the text memory 41. If it is determined that there is no text in the text memory 41 (i.e., if the answer is NO in S31), then the print control is finished. On the other hand, if it is determined that the text exists in the text memory 41 (i.e., if the answer is YES in S31), it is then determined whether or not "1" has been set to the label print flag 46 (S32). If it is determined that "1" has been set to the label print flag 46 (i.e., if the answer is YES in S32), then the routine proceeds to S33. If it is however determined that "1" has not been set to the label print flag 46 (i.e., if the answer is NO in S32), then the text is printed, and thereafter the print control is completed.

In S33, the text stored in the text memory 41 is printed on a tape by the thermal head 11. Thereafter, the KN value is read from the winding margin memory 44 and the tape is fed by one-half the winding-margin length according to the read KN value (S34). Then, a straight line is printed to extend in the transverse direction of the tape by the thermal head 11 (S35). A printed sample at this time is shown in FIG. 7A. FIG. 7A is a view describing the printed sample on which a text (which is represented as "TELEVISION" in the present embodiment) is printed on one side (left side in FIG. 7A) of the winding margin L and a straight line 1 is printed at the intermediate position of the winding margin L.

Figure 7B:
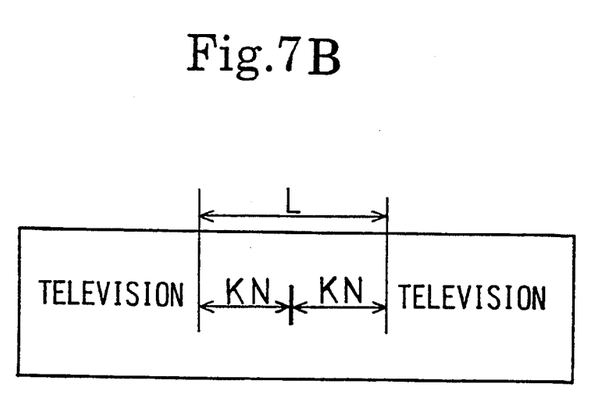
FIG. 7B is a view showing another printed sample in which a text is printed on the right side of the winding margin of the printed sample shown in FIG. 7(A).
Figure 8A:
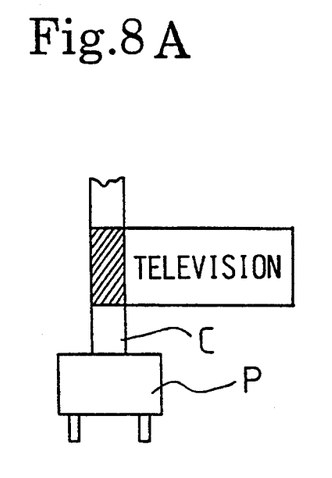
FIG. 8A is a front view showing the cord label in use.
Figure 8B:
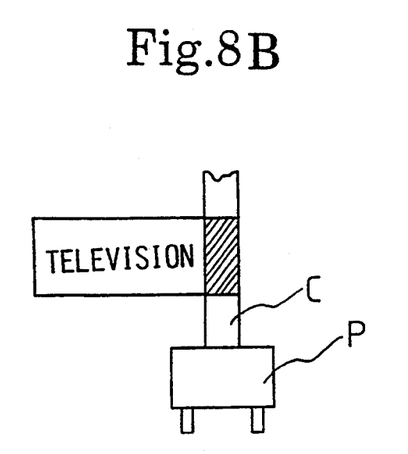
FIG. 8B is a back view showing the cord label of FIG. 8A in use.

Next, the KN value is read again from the winding margin memory 44 in S36, and the tape is fed by one-half the winding-margin length according to the KN value. Thereafter, the text in the text memory 41 is printed on the tape again (S37). A printed sample at this time is shown in FIG. 7B. FIG. 7B is a view describing the printed sample on which a text ("TELEVISION") is printed on the right side of the winding margin L of the printed sample shown in FIG. 7A. Thus, the texts are printed on both sides of the winding margin L set according to the size of the power cord as described above. Further, a cord label on which the straight line 1 has been printed at the intermediate position of the winding margin L to extend in the transverse direction of the tape is created. The so-created cord label is used by being wound on the periphery of a power cord C as illustrated in each of FIGS. 8A and 8B. The straight line 1, which has been printed at the intermediate position of the winding margin L as described above, is defined as the standard for the position where the cord label is wound on the power cord C. As shown in FIGS. 8A and 8B, the straight line 1 is normally positioned to each of the side portions of the cords C in a state in which plugs P have been held in horizontal positions. Thereafter, the label separates or releases the released paper from the pressure sensitive adhesive double coated tape 19 so as to be stuck on the periphery of the cord according to the winding margin L. Further, the portions for printing the texts on both sides of the winding margin L are bonded to each other so that the label is affixed to each cord C. As illustrated in FIGS. 8A and 8B, the types of the cords can be easily confirmed from the texts thus printed on the label whether the cords C are seen from either the front or back side.

In the cord label producing device 1 according to the present embodiment, as has been described above in detail, when the cord label is wound on the periphery of the cord, a desired winding margin is set according to the size of the cord, and the texts are printed on both sides of the winding margin. Further, the straight line is printed at the intermediate position of the winding margin so as to extend in the transverse direction of the label. Therefore, the cord labels each formed with the winding margin coincident with the size of each of various power cords can be created by an extremely simple operation. The so-created cord labels may be applied on the peripheries of the cords with the straight lines respectively printed at the intermediate positions of the winding margins as the standards while being wound on the peripheries thereof. Thus, the cord labels, which are easily and reliably affixed to the various cords, can be produced. Further, the characters or the like indicative of the kind of cord can be easily seen from any direction of the labels applied onto the cords. Hence, the kind of cord can be easily confirmed.

Alternatively, text may be printed on only one side of the winding margin. In this case, the text is printed on one side, the tape is fed by the winding-margin length and then the tape is additionally fed a length corresponding to the size of the printed image to leave a blank area where the second text would have been printed.

Incidentally, the present invention is not necessarily limited to the aforementioned embodiment. It is needless to say that many changes and modifications can be made without departing from the spirit or scope of the invention. For example, in the present embodiment, the winding-margin values are read from the table stored as data in the R OM 32, and each winding-margin value corresponding to the size of each cord is selected from the read winding-margin values and set. It is, however, apparent that the winding-margin value may be directly set by a number key provided on the keyboard 6. Alternatively, the size (diameter) of each cord may be input without setting the winding-margin value so that the winding-margin value is set from the value of the diameter by computation or via a table or the like.

What is claimed is:

1. A label producing device for printing labels that wind around a support, comprising:
   an input that inputs print data;
   a memory that stores data, including input print data;
   a winding margin determiner that determines a winding margin for the label based on a size of the support to which the label is to be wound around; and
   a printing mechanism that prints an image on a label medium corresponding to the input print data and the winding margin.

2. The label producing device of claim 1 further comprising a mode selector that selects one of a normal print mode and a label print mode.

3. The label producing device of claim 1 wherein the memory stores a winding margin table of values and the winding margin determiner selects one of the values from the memory.

4. The label producing device of claim 1 wherein the memory stores a support size table of values and the winding margin determiner determines the winding margin based on an input support size and a corresponding value from the support size table in the memory.

5. The label producing device of claim 1 wherein the winding margin determiner determines the winding margin based on a winding margin entered by the input.

6. The label producing device of claim 1 further comprising a detachable label medium cassette, wherein the label medium has an adhesive surface and a releasable backing removably affixed thereto.

7. The label producing device of claim 1 wherein the winding margin determiner determines one half of a winding margin and instructs the printing mechanism to print a central indicator on the label medium at the half winding margin.

8. The label producing device of claim 7 wherein the central indicator is a line extending transverse to a longitudinal direction of the label medium.

9. The label producing device of claim 1 further comprising a feeder that feeds the label medium through the printing mechanism for printing and advances the label medium based on the determined winding margin.

10. The label producing device of claim 9 wherein the feeder advances the label medium by one half of the winding margin for the printing mechanism to print a midpoint indicator.

11. The label producing device of claim 1 wherein the printing mechanism prints a double image spaced by the winding margin.

12. A label producing device for producing a cord label to be wound around a cord comprising:
   text producing means for creating texts to be printed on the label based on text data;
   a memory means for storing text data;
   printing means for printing an image on the label based on the stored text data;
   cord winding margin setting means for setting a margin that allows the label to be wound around the cord without disrupting the printed image; and
   print controlling means for controlling the printing means to print the image on at least one side of the margin set by the cord winding margin setting means based on the texts created by the text producing means.

13. The label producing device of claim 12, wherein the print controlling means controls the printing means to print a line at an intermediate position of the winding margin set by the cord winding margin setting means, wherein the printed line extends in a transverse direction of the label and indicates where to position the cord during assembly of the label onto the cord.

14. The label producing device of claim 12 further comprising a mode selecting means for selecting one of a normal print mode and a label print mode.

15. The label producing device of claim 12 wherein the memory means also stores a winding margin table of values and the cord winding margin setting means selects one of the values from the memory means.

16. The label producing device of claim 12 wherein the memory means also stores a cord size table of values and the cord winding margin setting means determines the winding margin based on an input cord size and a corresponding value from the support size table in the memory means.

17. The label producing device of claim 12 wherein the cord winding margin setting means determines the winding margin based on an input winding margin.

18. The label producing device of claim 12 wherein the cord winding margin setting means determines one half of a winding margin and instructs the print controlling means to control the print means to print a central indicator on the label at a central position in the winding margin.

19. The label producing device of claim 12 further comprising a feeding means for feeding the label through the printing means for printing and for advancing the label based on the winding margin.

20. The label producing device of claim 19 wherein the feeding means advances the label by one half of the winding margin for the printing means to print a midpoint indicator.

21. The label producing device of claim 19 wherein the feeding means advances the label by the winding margin and by a length corresponding to the printed image.

22. The label producing device of claim 12 wherein the print controlling means controls the printing means to print the image on both sides of the set margin on the label.

23. A method of producing a label for winding around a support with a winding margin that corresponds to the size of the support, the method comprising the steps of:
   storing print data;
   determining a winding margin that corresponds to the size of a support on which the label is to be wound;
   printing an image on the label based on the input print data; and
   feeding the label a length corresponding to the winding margin.

24. The method of claim 23 further comprising the step of printing another image on the label based on the input print data after feeding the label a length corresponding to the winding margin.

25. The method of claim 23 further comprising the step of selecting a label print mode prior to determining the winding margin.

26. The method of claim 23 wherein the step of feeding the label includes feeding the label a distance of one half of the winding margin, printing a central indicator mark and feeding the label a distance of the remaining half of the winding margin.

27. The method of claim 23 further comprising the step of storing a table of winding margin values and wherein the step of determining the winding margin includes selecting a winding margin from the stored table.

28. The method of claim 23 further comprising the step of inputting a size of the support to which the label is to be wound and wherein the step of determining the winding margin includes determining the winding margin based on an input support size.

29. The method of claim 23 wherein the step of determining the winding margin includes inputting the winding margin.

30. The method of claim 23 wherein the step of feeding the label includes feeding the label an additional length equivalent to the printed image after feeding the label the length corresponding to the winding margin.

* * * * *